Figure 1:
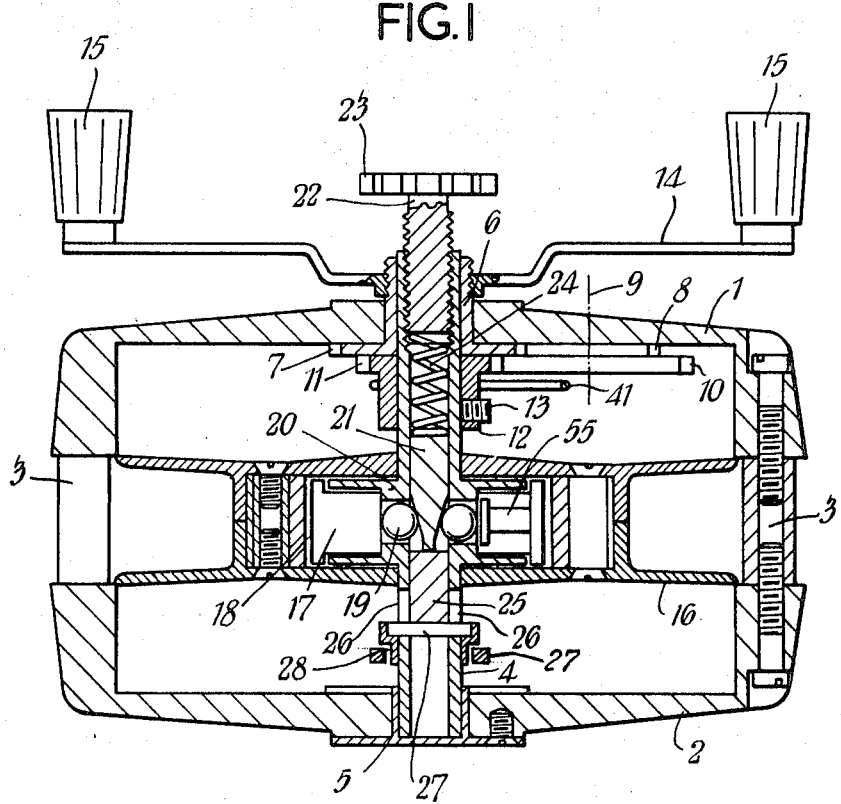

United States Patent
Kosek

[15] 3,652,031
[45] Mar. 28, 1972

[54] FISHING REEL
[72] Inventor: Joseph Kosek, 11, Elgin Crescent, Caterham, Surrey, England
[22] Filed: Oct. 20, 1967
[21] Appl. No.: 676,831

[30] Foreign Application Priority Data
Oct. 25, 1966  Great Britain ..................... 47,772/66

[52] U.S. Cl. ........................................... 242/219, 242/84.5
[51] Int. Cl. ..................................................... A01k 89/02
[58] Field of Search ............. 242/84.44, 84.45, 84.46, 84.51, 242/84.54, 84.5, 84.51

[56] References Cited

UNITED STATES PATENTS

| | | | |
|---|---|---|---|
| 2,001,521 | 5/1935 | Cattley | 242/84.44 |
| 2,536,583 | 1/1951 | Tank | 242/84.46 X |
| 3,166,268 | 1/1965 | Clark | 242/84.44 |
| 996,348 | 6/1911 | Kramer | 242/84.51 |
| 1,730,332 | 10/1929 | Pflueger | 242/84.51 |
| 1,890,736 | 12/1932 | Lenz | 242/84.54 X |
| 2,209,598 | 7/1940 | Coxe | 242/84.44 |
| 2,282,995 | 5/1942 | Dumond | 242/84.44 |
| 2,354,530 | 7/1944 | McMahon | 242/84.44 |

*Primary Examiner*—Billy S. Taylor
*Attorney*—Stevens, Davis, Miller & Mosher

[57] ABSTRACT

A fishing reel of the rotatable line-spool type having a resiliently engaged line brake clutch which is manually releasable to provide casting by overcoming the resilient engaging means and freeing the spool for rotation. The reel includes a silent one-way winding mechanism, a line over-run brake and an automatically releasable bite alarm mechanism.

15 Claims, 5 Drawing Figures

FISHING REEL

This invention relates to fishing reels.

The fishing reel which will be described by way of example incorporates several improvements and exhibits certain automatically functioning parts. The various parts cooperate with one another so as to provide an inexpensive fishing reel. In particular, a reel in accordance with the invention is superior to conventional so-called "multiplier" reels, that are employed for freshwater and light game fishing. The construction and arrangement of a reel in accordance with the invention are such that, in order to make a cast, it is unnecessary to invert the fishing rod, to hold the line or its spool under finger pressure at any time or to operate any switch or the like either before or after the cast. All that is necessary is to apply finger pressure to the aforementioned operating lever or the like at the correct moment when swinging the rod forward during a cast and to maintain this pressure until the cast has been completed. The fact that it is unnecessary to hold either the line or its spool with a finger during the cast is made possible by the use of an automatic over-run or casting brake which is brought into action by the operating lever or the like quite automatically and at the correct time to prevent over-running of the line. The brake is not in operation at the instant when the line spool starts to rotate so that jerking and loss of kinetic energy from this source are prevented. After a cast has been made, the brake is automatically returned to an inoperative position as the clutch is re-engaged by releasing the operating lever or the like. Separate means are provided for adjusting both the clutch and the over-run brake to suit individual tastes.

The reel which will be described includes a one-way mechanism arranged to enable the main shaft of the reel and the line spool which it carries to be rotated in one direction only at times when the said mechanism is operative. This mechanism is entirely silent in its operation and does not make the annoying clicking noise associated with conventional pawl and ratchet one-way mechanisms. The reel includes an automatically releasable audible alarm mechanism which can be placed in operation when, for example, the fishing rod is put on a rest to await a bite. When it is operative, the alarm mechanism neutralizes the one-way mechanism mentioned above so that the main shaft and the line spool mounted thereon can rotate readily in the "winding out" direction to the accompaniment of a loud clicking noise which will at once inform the angler that he has a bite. Immediately the angler starts to rotate the main shaft of the reel in the "winding in" direction, the alarm mechanism is automatically disengaged and the one-way mechanism simultaneously re-engaged so that, henceforth, the line can only wind out by slipping of the adjustable friction clutch.

A gear transmission is provided between the winding handle of the reel and its main shaft so that the speed of rotation of the latter will be substantially greater than that of the former during use of the reel. The gear transmission is formed in such a way as to allow the winding handle to be located centrally of the reel and the teeth of its pinion also serve as parts of the one-way mechanism and audible alarm mechanism that have been mentioned above.

According to the invention, there is provided a fishing reel comprising a line spool which is arranged to rotate to allow the unwinding of line therefrom during operations such as casting, means defining an axis of rotation for the spool and means for rotating said spool, wherein the improvement comprises the provision of a clutch disposed between the spool and the last-mentioned means, resilient means arranged to tend to maintain the clutch in engagement and releasing means manually operable to provide casting by overcoming the resilient means and freeing the spool for rotation.

Figures 2A, 2B:
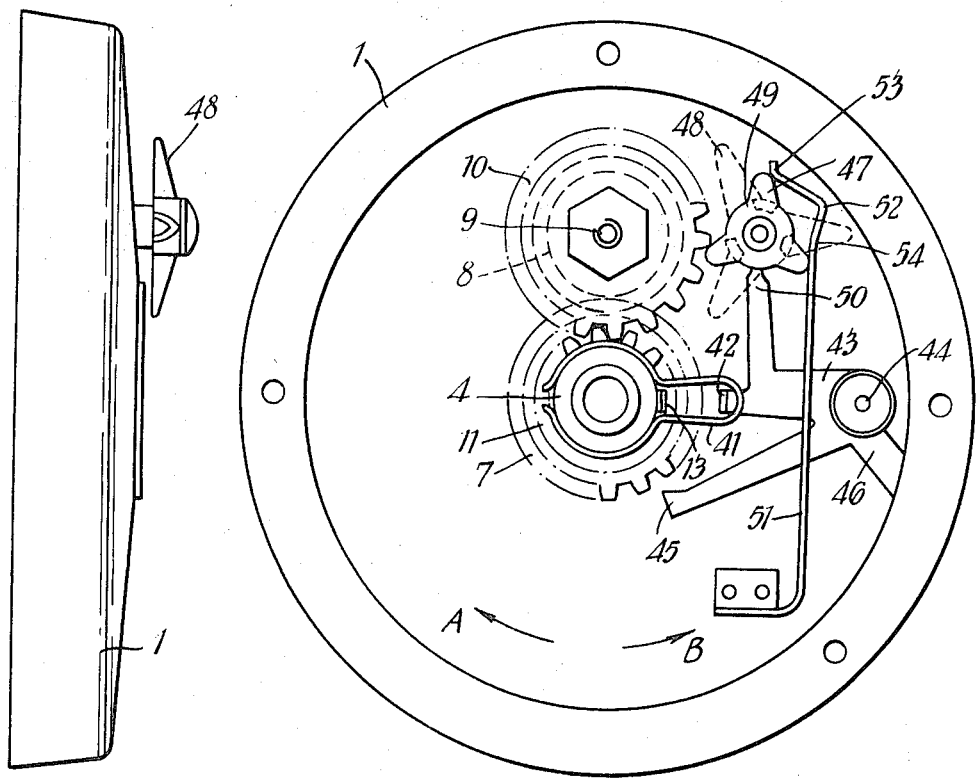
Figures 3A, 3B:
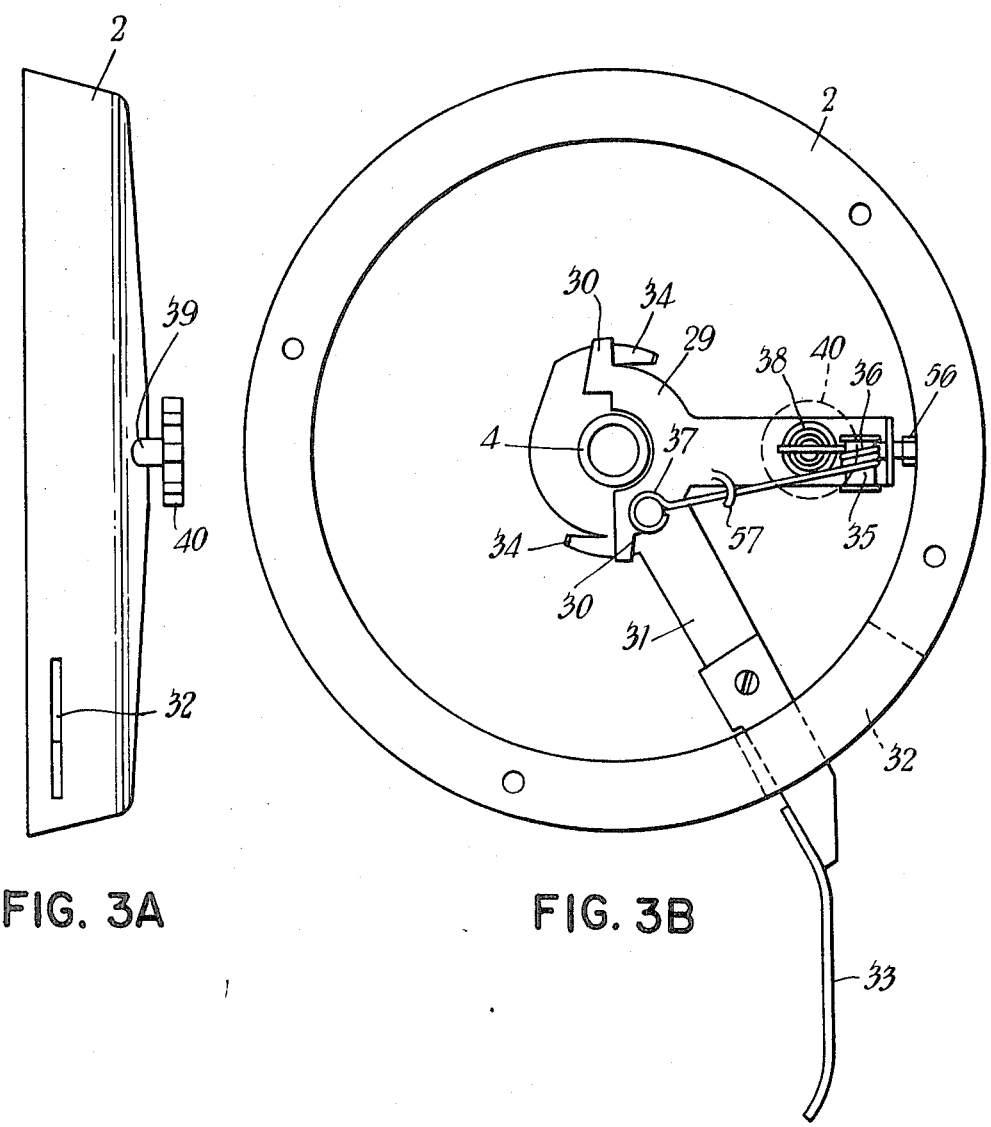

For a better understanding of the invention, and to show how the same may be carried into effect, reference will now be made, by way of example, to the accompanying drawings, in which:

FIG. 1 is a sectional side elevation showing the line spool, main shaft and body of a reel in accordance with the invention, together with other associated parts, FIGS. 2A and 2B are elevations of the interior of one side or part of the body of the reel showing the one-way drive mechanism of the shaft and an audible alarm mechanism, and FIGS. 3A and 3B are elevations of the interior of the other side or part of the body of the reel showing the releasing means for the clutch and also the over-run brake.

Referring to the drawings, the reel has a body consisting of two generally circular sides or parts 1 and 2 which, when the body is assembled, are rigidly interconnected by bridges 3 and by a shoe (not shown) shaped for attachment to a rod with which the reel is to be used.

One end of a hollow or tubular main shaft 4 is rotatably journaled in a plain blind bearing 5 rigidly mounted at the center of the body part 2. The opposite end of the main shaft 4 is rotatably journaled in a sleeve or bush 6 which is itself rotatably journaled centrally of the body part 1 in axial alignment with the bearing 5. The inner end of the rotatable bush 6 carries a toothed pinion 7 whose teeth are in mesh with those of a second pinion 8 mounted so as to be rotatable about an axis 9 afforded by a pivot (not shown in FIG. 1) rigidly secured to the body part 1. A third larger toothed pinion 10 is rigid with the pinion 8 and its teeth mesh with those of a fourth pinion 11. The pinion 11 has a boss 12 which is arranged around the main shaft 4 and rigidly secured to the latter in any convenient manner. In the embodiment illustrated in the drawings, a series of grub screws 13 or the like is employed. An operating handle 14 is secured to journaled end of the bush 6 which projects externally of the body part 1 and the number of teeth provided on the various pinions 7, 8, 10 and 11 is such that, upon turning the operating handle 14 with the aid of one of a pair of knobs 15, the main shaft 4 will be rotated at exactly twice the speed of rotation of the bush 6.

A line spool 16 is rotatably journaled on the main shaft 4 approximately mid-way along the length of the latter and is connected thereto by a friction clutch. The principal components of the clutch are arranged internally of the hub of the line spool 16 within a central boss 20 of the main shaft 4. Two or more pivotally mounted blocks 17 whose radially outermost faces are lined with friction material 18 are contacted at their radially innermost sides by corresponding push rods 55. The push rods 55 are, in turn contacted by balls 19 lodged in radial openings formed in the central boss of the main shaft 4, these balls bearing against a conically tapered portion of a rod 21 slidably mounted internally of the hollow or tubular main shaft 4. The end of the main shaft 4 which projects from the body part 1 through the bush 6 is internally screw-threaded and a correspondingly screw-threaded spindle 22 carrying a knurled knob or the like 23 is entered therein. As can be seen in FIG. 1 of the drawings, a compression spring 24 is housed between the innermost end of the spindle 22 and the adjacent end of the slidable rod 21. It will be evident that, the further the spindle 22 is screwed into the end of the shaft 4, the more strongly will the rod 21 be urged towards the bearing 5 by the compressed spring 24. The conically tapered portion of the rod 21 thus urges the balls 19 radially outwardly with a force of proportionally great magnitude to press the linings 18 of the blocks 17 into frictional engagement with a concave inner surface of the hub of the line spool 16. Relatively weak restoring springs (not shown in the drawings) are provided which are arranged to turn the blocks 17 radially inwardly into positions in which the linings 18 are ineffective.

A further slidable rod 25 is arranged internally of the main shaft 4 with its end in contact with the apex of the conically tapered portion of the rod 21. A pair of axially parallel but diametrically opposed slots 26 is formed through the wall of the shaft 4 in the region of the rod 25 and a transverse pin 27 is entered through these slots, the side of the said pin bearing against the end of the slidable rod 25 remote from the rod 21. A shouldered cap 28 is arranged around the shaft 4 so as to embrace the opposite ends of the pin 27. The cap 28 can be moved axially of the shaft 4 in such a way that it carries the pin 27 with it. The cap 28 also acts to prevent the pin 27 from moving axially out of the slots 26. A yoke 29 (FIG. 3) which is of rigid formation has its radially outermost end loosely connected to the body part 2 with the aid of a screw 56. The radially innermost end of the yoke 29 carries two approximately diametrically opposed lugs 30 and, as can be seen in FIG. 3 of the drawings, it has a generally curved portion extending between the lugs 30, this portion being arranged in abutting relationship with the shoulder of the cap 28.

A clutch releasing lever 31 (FIG. 3) is turnable about the innermost end of the bearing 5, its radially outermost end being entered through a slot 32 formed in the wall of the body part 2. The part of the lever 31 which projects through the slot 32 carries a handle 33 adapted to be pressed by the finger or thumb during use of the reel. If desired, the lever 31 and handle 33 may be formed integrally. The lever 31 carries two inclined cams 34 arranged to cooperate with the lugs 30 of the yoke 29 in such a way that, upon turning the lever 31 in an anti-clockwise direction in the slot 32 (as seen in FIG. 3), the cams 34 force the yoke 29, cap 28, pin 27 and rods 21 and 25 towards the bush 6. As will be evident from FIG. 1 of the drawings, this action overcomes the effect of the spring 24 and allows the blocks 17 to turn radially inwardly under the action of the aforementioned weak restoring springs that are not shown in the drawings. The clutch is thus fully released allowing the line spool 16 to rotate freely about the hub 20 of the main shaft 4 in which the clutch is housed.

Referring again to FIG. 3 of the drawings, it will be seen that the yoke 29 carries a pivot pin 35 around which a coil spring 36 is wound. The opposite ends of the spring 36 project from the pin 35 and one of them is formed as a loop 37 adapted to hold a cylindrical brake block. A hook 57 whose root is fastened to the yoke 29 engages the last mentioned end between the pin 35 and the loop 37. The opposite and shorter end of the spring 36 is engaged in the slot of a slotted member 38 which cooperates with a screw spindle 39 carrying a knurled adjusting knob 40. The knob 40 is located externally of the body part 2 while the internal end of the spindle 39 bears against the shorter end of the spring 36. On screwing the spindle 39 further into the member 38, the spring 36 will be turned about the pin 35 so that the longer end of the spring 36 carrying the brake block located in the loop 37 will be urged more strongly towards the neighboring side of the line spool 16 and into engagement with the hook 57.

The reel includes a one-way mechanism and also an audible alarm mechanism the details of which can be seen in FIG. 2 of the drawings. A spring clip 41 whose shape can be seen in FIG. 2 is engaged frictionally around the boss 12 of the pinion 11, said clip including a loop through which a finger 42 carried by a lever 43 is entered. The lever 43 is turnably mounted on a pivot pin 44 carried by the body part 1.

On turning the main shaft 4 in the direction indicated by the arrow A IN FIG. 2 of the drawings, the clip 41 will tend to be carried with it and, by way of the finger 42, will turn the lever 43 about the pivot pin 44 in a relatively opposite direction. The clip 41 will, of course, slip as soon as its rotation is opposed by any substantial force. A tooth 45 carried by the lever 43 will thus be maintained clear of the teeth of the pinion 7. It should be noted that the annoying clicking caused by a conventional one-way pawl and ratchet mechanism is entirely avoided in this way. A stop 46 rigid with the lever 43 prevents the latter from being turned too far about the pin 44 in a direction opposite to the direction A.

Upon turning the main shaft 4 in the direction indicated by the arrow B in FIG. 2 of the drawings, the clip 42 will, once again, tend to be turned in the same direction so that the lever 43 will be turned about the pin 44 in a direction opposite to the direction B. This immediately brings the tooth 45 into restraining engagement with the teeth of the pinion 7 and prevents any further rotation of the shaft 4 in the direction B.

A star wheel 47 having three teeth is turnably mounted in the wall of the body part 1 and can be rotated from the exterior or of the reel with the aid of a three-armed knob 48. The star wheel 47 has a boss beneath its teeth, this boss including three profiled recesses 49 any one of which can cooperate with a profiled tooth 50 rigid with the lever 43. The form of cooperation is such that the star wheel 47 can only be rotated in one direction by the knob 48. A blade spring 51 has one end secured to the body part 1 and its opposite unanchored end shaped and arranged to cooperate with the teeth of the star wheel 47. The star wheel 47 can occupy a normal inoperative position in which it is rotated through 60° relative to the position illustrated in FIG. 2. In this normal position, all the teeth of the star wheel 47 will be clear of those of the pinion 10 while one tooth of the said star wheel will be engaged with the apex 52 of the shaped end of the blade spring 51. The blade spring thus tends to retain star star wheel 47 in the position just mentioned. It should also be noted that, at this time, the tooth 50 is in register with one of the recesses 49 so that the previously mentioned tooth 45 can move in to, or out of, engagement with the teeth of the pinion 7 in accordance with the direction of rotation A or B of the main shaft 4.

The knob 48 can be employed to turn the star wheel 47 in the direction A into an operative position as illustrated in FIG. 2. A surface of the tooth 50 and a surface of one of the recesses 49 cooperate slidably to allow this to take place. If an attempt is made to turn the star wheel 47 in the direction B, the point of the tooth 50 is jammed into a corner of one of the recesses 49 and the turn cannot be completed. In the operative position, one tooth of the star wheel 47 meshes with the teeth of the pinion 10 while the other two teeth make contact with portions 53 and 54 respectively of the blade spring 51. The tooth 50 makes contact with a non-recessed portion of the boss carried by the star wheel 47 and thus maintains the tooth 45 clear of engagement with the teeth of the pinion 7. If the pinion 10 should be turned in the direction indicated by the arrow A, the star wheel 47 will tend to turn in the opposite direction. The various parts are positioned and dimensioned in such a way that the tooth of the wheel 47 in mesh with the pinion 10 is not turned sufficiently far to bring the tooth thereof in contact with the portion 54 of the blade spring 51 clear of this portion. The star wheel 47 therefore oscillates with a loud clicking noise. However, immediately the pinion 10 is turned in the opposite direction B, the star wheel 47 is itself turned in a relatively opposite direction and the various parts are so positioned relative to one another that the tooth of the star wheel 47 in mesh with the pinion 10 is turned far enough to bring the tooth thereof which is abutting against the portion 53 of the blade spring 51 past this portion so that the spring subsequently forces it into engagement with the apex 52. The star wheel 47 therefore once again occupies its inoperative position in which all its teeth are maintained just clear of the pinion 10.

When making a cast using a reel of the kind which has been described, the angler depresses the operating handle 33 towards the rod by means of his forefinger or thumb so that the clutch is immediately disengaged in the manner previously described. This allows the line spool 16 to rotate completely freely upon the relatively stationary main shaft 4. Since the line spool 16 is preferably made from a light material such as, for example, aluminum, aluminum alloy, or a synthetic plastic, only a very small fraction of the kinetic energy of the weighted hook and bait is lost in overcoming the inertia of the said spool.

The various parts of the reel are so arranged that, as an angler fully depresses the operating handle 33 for casting, the clutch is first immediately released while the over-run brake remains out of action. This allows the line spool 16 to reach its maximum speed of revolution without jerking. Before the lever 31 reaches the end of the slot 32, the brake block carried in the loop 37 that is restrained by the hook 57 comes gently into engagement with the side of the line spool 16, or, if preferred, into engagement with a separate part carried by said line spool. The brake acts to eliminate differences between the angular deceleration of the line spool 16 and the linear deceleration of the weighted line itself and thus ensures that the spool 16 does not over-run with a consequent tangling of the line. Nevertheless, the over-run brake is maintained out of action at times when it would have an adverse effect on the length of the cast. Adjustments of the action of the brake to suit individual tastes and to compensate for wear of the brake block are made by rotating the knob 40 to increase or decrease the effect of the spring 36.

As soon as a cast has been made, the handle 33 is released so that the spring 24 re-engages the clutch and withdraws the over-run brake to an inoperative position with the aid of the hook 57. Any pull on the line will tend to turn the main shaft 4 in the winding-out direction B (FIG. 2). This is prevented by the one-way mechanism so that the line can only wind out if the clutch slips. The clutch thus performs the function of the "main brake" of a conventional reel. The pull which must be exerted before such slipping will take place can be varied by suitable adjustments of the knurled knob 23 which, as previously described, is used to increase or decrease the degree of compression of the spring 24. The knob 23 is, in fact, adjusted so that the clutch will slip before the breaking strain of the particular line being used is reached. thus, a hooked fish will not be able to break the line but will have to fight hard to unwind it.

When an angler has made a successful cast, he may place his rod on a rest and, as previously described, he can then turn the knob 48 in the direction A to place the audible clicking mechanism illustrated in FIG. 2 in operation. This mechanism positively disengages the one-way drive mechanism so that the main shaft 4 can rotate in a winding-out direction to the accompaniment of an audible clicking noise caused by oscillation of the star wheel 47 with a consequent hammering of one of its teeth against successive ones of those of the pinion 10. However, as previously described, immediately the angler becomes aware that he has a bite and starts to wind in his line with the aid of the handle 14 the audible clicking mechanism is automatically thrown out of action and into its inoperative position. The one-way drive mechanism is re-engaged so that, henceforward, the line can only wind out by slipping out of the clutch.

It will be apparent that the invention provides a universal fishing reel of the rotatable line spool type which, by virtue of the novel mechanism which is employed during casting, makes it possible for an inexperienced angler to make excellent casts without difficulty. It is preferred that the line spool 16 and the majority of the body parts of the reel should be made from a synthetic plastic material which may, if desired, be transparent or semi-transparent. However, any other material of sufficient strength and sufficient lightness may be employed.

The universal fishing reel which has been described embodies all the novel features mentioned at the beginning of the Specification but it is emphasized that this is not essential. A fishing reel may, for example, be provided without the change speed gearing between its winding handle and its main shaft or without the automatically releaseable audible alarm mechanism or without both these features. Moreover, certain features of the invention which have been described may be applied singly, or in combination, to conventional fishing reels. For example, an otherwise conventional fishing reel may be provided with change speed gearing constructed and arranged in the manner which has been described and/or with an automatically releasable audible alarm mechanism.

I claim:

1. In a fishing reel comprising a housing having shaft means therein, a line spool rotatably mounted on said shaft means to allow the unwinding of line therefrom; means for rotating said spool; and a friction clutch located substantially wholly within the spool and normally engaged to maintain said spool in driven connection with said rotating means, the improvement of means to equip said fishing reel for casting comprising releasing means for said spool, said releasing means being so constructed and arranged as to be manually operated by the user during the cast to release said clutch substantially instantaneously, at least some parts of said releasing means being located internally of said shaft means.

2. In a fishing reel wherein a line spool is rotatably mounted in a housing to allow the unwinding of line therefrom during operations such as casting, said reel having a main shaft defining an axis of rotation for said spool, operating means for rotating said spool, a one-way drive mechanism between said operating means and said spool, and a friction clutch coupling said spool and said operating means with resilient means tending to maintain said clutch in engagement, said clutch lying substantially wholly internally of the spool, the improvement of means to equip said fishing reel for casting comprising releasing means adapted to move in one direction under manual pressure to overcome said resilient means, thereby disengaging said clutch, said releasing means being so constructed and arranged within said main shaft as to move in an opposite direction upon release of the manual pressure, thereby permitting re-engagement of said clutch.

3. A fishing reel equipped for use in casting comprising a line spool rotatably mounted in a housing to allow the unwinding of line therefrom during operations such as casting, a main shaft having said spool mounted thereon and defining an axis of rotation, operating means for rotating said spool in a wind-up direction, a one-way drive mechanism and a friction clutch being located substantially wholly in the interior of the spool, resilient means normally biasing said clutch to an engaged position to maintain the spool in drivable condition with said operating means and clutch-releasing means manually operable independently of said operating means to release the clutch substantially instantaneously during the cast thus disconnecting the spool from the operating means thereby allowing the spool to rotated substantially freely at least some parts of said clutch-releasing means being located internally of the main shaft.

4. A fishing reel as claimed in claim 3 wherein said main shaft is hollow; said resilient means comprising a compression spring located within said shaft, and a rod slidably movable axially of the interior of said shaft, said rod being acted upon by said compression spring; and said clutch comprises movable elements adapted to be urged outwardly by said rod from the axis of said shaft, and clutch members adapted to be pressed into frictional engagement with said spool by said movable elements.

5. A fishing reel as claimed in claim 4 wherein one end of the interior of the hollow main shaft is screw-threaded, a correspondingly screw-threaded spindle received in said one end, said spindle bearing against one end of the compression spring; manual rotating means operatingly attached to said spindle so that the torque required to cause said clutch to slip can be adjusted by altering the degree of initial compression of the spring to enable said clutch to act as a line brake.

6. The fishing reel of claim 4 wherein said rod has a tapered portion formed therein and said movable elements are balls, said balls cooperating with said tapered portion to press said clutch members into frictional engagement with said spool.

7. A fishing reel as claimed in claim 6, wherein the releasing means comprises a lever manually turnable about the axis of the main shaft, said lever being indirectly connected to the tapered portion of said rod in such a way that the lever can be turned to move the rod in a direction that will further compress said spring and allow the clutch members to become free of frictional engagement with the spool.

8. A fishing reel as claimed in claim 3, further comprising an audible alarm mechanism movable between operative and inoperative settings, means in the former setting to cause the one-way mechanism to be neutrailzed to allow the spool to rotate in the normally prohibited direction to the accompaniment of an alarm sound.

9. A fishing reel as claimed in claim 8, wherein the alarm mechanism is so arranged that, upon the spool commencing to be wound in the normally allowed direction, means are actuated to bring the alarm mechanism automatically to its inoperative setting and the one-way mechanism automatically to an operative condition.

10. A fishing reel as claimed in claim 8, wherein the audible alarm mechanism comprises a star wheel, a boss shaped to define a plurality of recesses and a resilient element adapted to contact the star wheel, the arrangement being such that when the alarm is operative, a tooth of the star wheel meshes with a further toothed wheel, the resilient element tending to maintain the angular setting of the star wheel in such a way that rotation of said further toothed wheel causes "hammering" of said one tooth of the star wheel against the teeth of said further toothed wheel, the boss cooperating with a part of the one-way mechanism to render the latter inoperative at such time.

11. A fishing reel as claimed in claim 3 further comprising an adjustable over-run brake for said spool.

12. A fishing reel as claimed in claim 3, further comprising change speed gearing connecting the operating means to said main shaft, said operating handle, change speed gearing, and main shaft being arranged in such a way that the axes of rotation of the handle and shaft are substantially coincident.

13. A fishing reel as claimed in claim 12, wherein at least one pinion of the change-speed gearing also forms part of the one-way mechanism.

14. A fishing reel as claimed in claim 3, further comprising adjusting means manually operable to adjust said resilient means prior to the cast.

15. A fishing reel as claimed in claim 3, wherein the one-way mechanism comprises a pivotally mounted pawl lever turnable between engagement and disengagement with a toothed member connected to the main shaft, an element non-rigidly connected to said pawl lever, and a part rigidly connected to said toothed member, said part being frictionally engaged by said element, the construction and arrangement being such that, upon the toothed member tending to rotate in the prohibited direction, the element turns the pawl lever about its pivot to prevent such rotation, and such that, upon the toothed member tending to rotate in the allowed direction, the element turns the pawl about its pivot to a position in which it is clear of contact with said toothed member whereby substantially silent rotation of the toothed member in the allowed direction is effected, said element slipping relative to said part as soon as the pawl lever is blocked against further turning about its pivot.

* * * * *